United States Patent [19]

Faye

[11] Patent Number: 4,805,205
[45] Date of Patent: Feb. 14, 1989

[54] METHOD AND DEVICE FOR ESTABLISHING BIDIRECTIONAL COMMUNICATIONS BETWEEN PERSONS LOCATED AT DIFFERENT GEOGRAPHICALLY DISTANT STATIONS

[76] Inventor: Andre Faye, 14-16 Rue du Faubourg, St. Honore, 75008 Paris, France

[21] Appl. No.: 46,588

[22] Filed: May 4, 1987

Related U.S. Application Data

[63] Continuation of Ser. No. 619,341, Jun. 11, 1984, abandoned, which is a continuation-in-part of Ser. No. 269,898, Jun. 3, 1981, abandoned.

[30] Foreign Application Priority Data

Jun. 11, 1980 [FR] France .................................. 80 13003

[51] Int. Cl.$^4$ ...................... H04M 1/57; H04M 3/56; H04M 11/00; H04Q 3/72
[52] U.S. Cl. ......................................... 379/96; 379/94; 379/142; 379/205; 379/247; 379/357
[58] Field of Search ............... 379/204, 205, 202, 206, 379/357, 142, 91, 94, 144, 96, 245, 247

[56] References Cited

U.S. PATENT DOCUMENTS

| | | | |
|---|---|---|---|
| 3,686,440 | 8/1972 | Kroeger | 379/142 |
| 3,700,814 | 10/1972 | Spraker | 379/99 |
| 3,725,947 | 4/1973 | Albertini et al. | 379/114 |
| 3,870,830 | 3/1975 | Tapiei | 379/40 |
| 3,932,709 | 1/1976 | Hoff et al. | 379/96 |
| 4,071,710 | 1/1978 | Burnett | 379/171 |
| 4,184,048 | 1/1980 | Alcaide | 381/83 |
| 4,304,968 | 12/1981 | Klausner et al. | 379/69 |
| 4,326,123 | 4/1982 | Hosterman | 235/380 |

FOREIGN PATENT DOCUMENTS

| | | | |
|---|---|---|---|
| 0041902 | 12/1981 | European Pat. Off. | 379/205 |
| 2318185 | 10/1974 | Fed. Rep. of Germany | 379/104 |
| 2390864 | 12/1978 | France . | |
| 0132105 | 10/1979 | Japan | 379/142 |

OTHER PUBLICATIONS

"A Communication System for Remote Conference" published in Systems Technology, No. 24, Jun. 1976, pp. 17–21.

"The Evolution of a Multimode Multilocation Audioconferencing System" published in Electro Conference Record, vol. 4, Apr. 1979, pp. 1–11.

Primary Examiner—Thomas W. Brown
Attorney, Agent, or Firm—Steinberg & Raskin

[57] ABSTRACT

A method and a device for establishing communication between several persons distant from one another. The method allows, by means of an appropriate spatial multiplexing, speech signals and signalling signals to be transmitted simultaneously between at least two stations ST1, ST2 connected together by a special connection. Each station comprises at least one communication unit U' comprising a microphone, a badge reader identifying a person, and a synoptic panel representing the geographical situation of the stations of a same network by display constituted by diodes and the illumination state of which indicates the state of each station of the network during a conference.

32 Claims, 5 Drawing Sheets

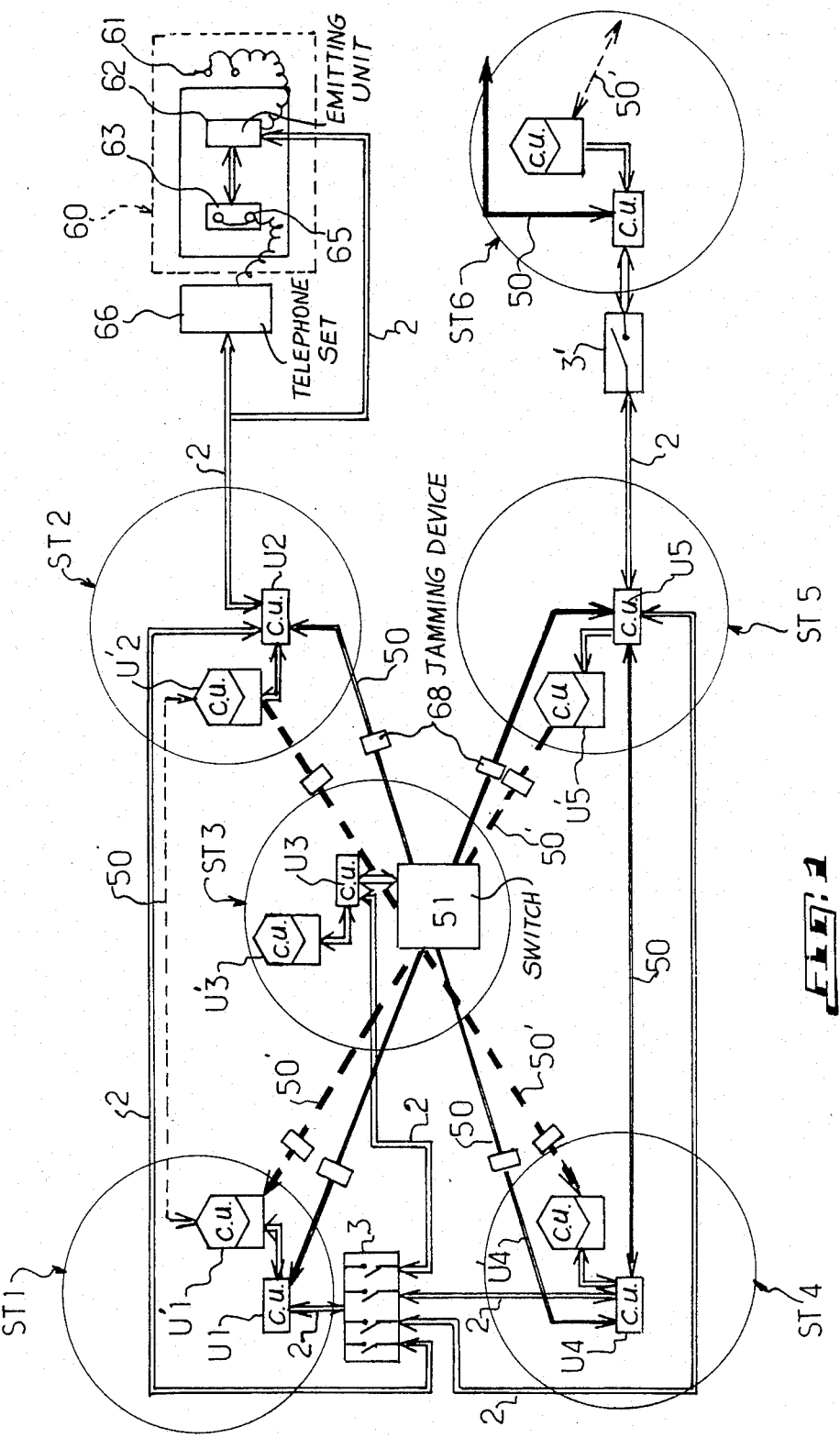

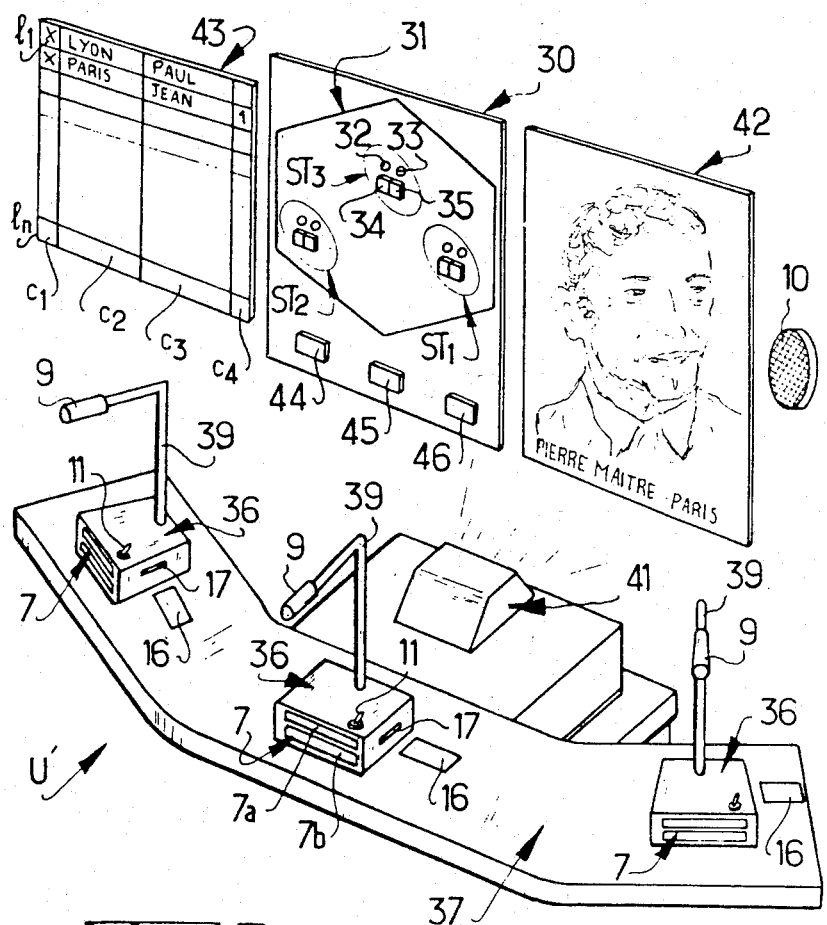
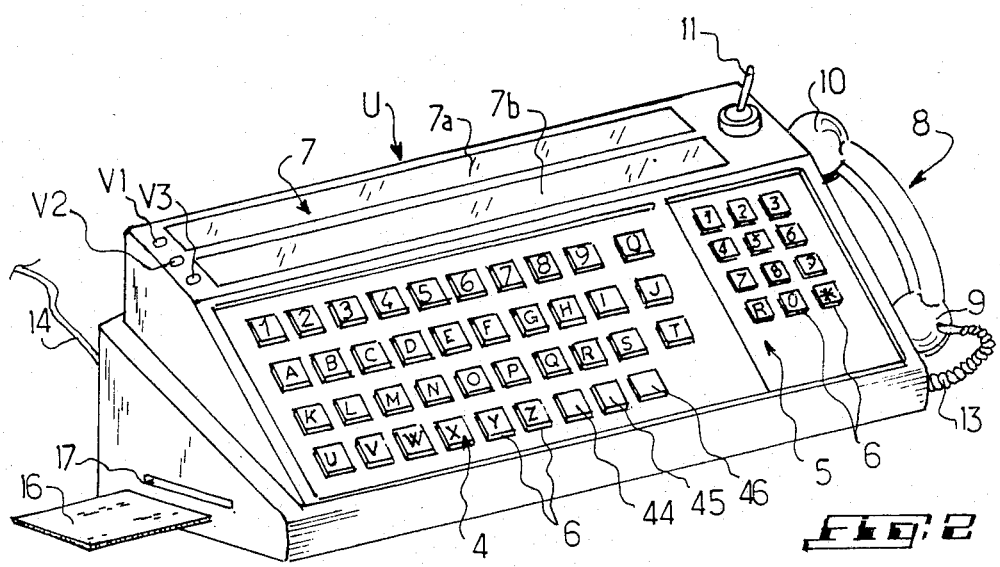
Fig. 4
Fig. 2

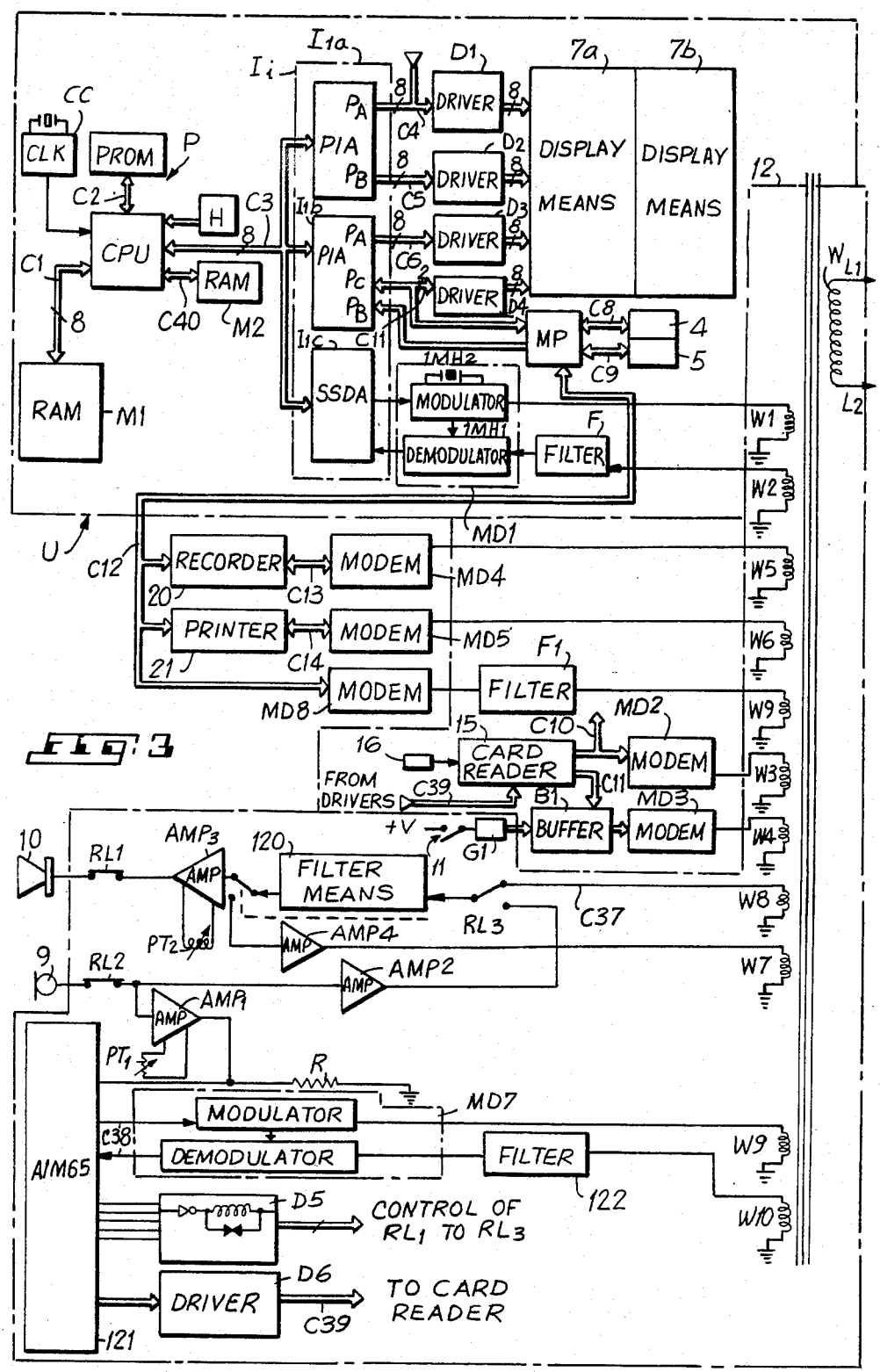

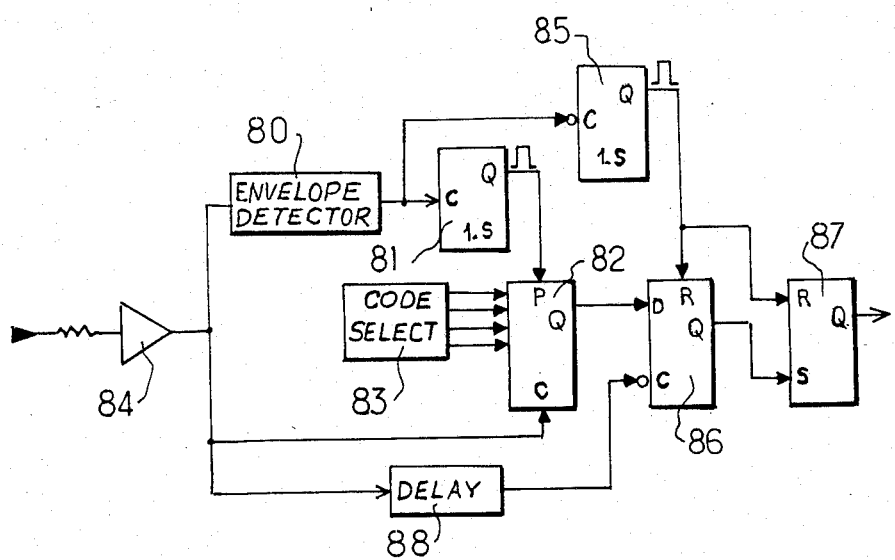
_FIG. 6_

METHOD AND DEVICE FOR ESTABLISHING BIDIRECTIONAL COMMUNICATIONS BETWEEN PERSONS LOCATED AT DIFFERENT GEOGRAPHICALLY DISTANT STATIONS

CROSS REFERENCE TO RELATED APPLICATIONS

This is a Continuation of application Ser. No. 619 341, filed June 11, 1984, now abandoned, which in turn is a Continuation In Part of application Ser. No. 269,898, filed June 3, 1981, now abandoned.

BACKGROUND OF THE INVENTION

The present invention relates generally to the communication techniques for exchanging information between different persons, and has more particularly for a subject matter a method and a device for establishing bidirectional and/or conferencing communications between different persons grouped into different geographically distant stations and interconnected by telephone lines such as special connections, to allow particularly the preparation and holding of distant conferences.

As soon as a person utters the word "conference", it goes without saying that the different partakers in this conference will be grouped at the same geographical location.

However, due to the constant evolution of communication techniques, there exist systems of distant conferences between several persons interconnected by special connections, but these systems are complicated and have a major drawback, namely that the number of partakers is limited.

SUMMARY OF THE INVENTION

The principle object of the invention is to provide a conferencing telephone communication system having reliable and coherent information exchanges.

An object of the invention is to provide a conferencing telephone communication system having no limitations to participants in a conference.

Another object of the invention is to provide a conferencing telephone communication system which permits the transmission of messages simultaneously with speech signals.

Still another object of the invention is to provide a conferencing telephone communication system which permits the holding of conferences by permitting simultaneous use of complementary expression means of communication to ensure a telephone conversation, the transmission of messages, the identification of speakers through the medium of badges, the representation on a synoptic panel of a whole network, of the instantaneous state of each station constituting the network and of the evolution of that state during a conference, and the transmission of data.

Yet another object of the invention is to provide a conferencing telephone communication system in which the number of persons participating in a conference is not limited, those persons may be located within different rooms of the same station and each room is provided with the apparatus of the invention connected to the apparatus of the other stations of the system.

Another object of the invention is to provide a conferencing telephone communication system wherein requests for intervention during a conference are displayed at each station of the network, thus improving the progress of the conference.

The invention therefore provides a method for establishing bidirectional or conferencing telephone communications between different persons grouped into different geographically distant stations interconnected by telephone lines, each station comprising at least one emitting unit having a reading device and at least one microphone, a receiving unit having at least one loudspeaker, and a display unit, said method utilizing individual information media such as badges bearing coded information identifying each person before communicating and during the communication, said method comprising the steps of: (a) emitting a coded call signal modulated in frequency from the emitting unit of his station by a person at one of said stations who wishes to initiate a conference between at least two stations to the stations where persons to be invited to participate in the conference are located; (b) materializing said coded call signal after demodulation thereof at least at each of the stations receiving said coded call signal; (c) switching on the emitting unit of each called station only when said emitting unit has been identified by a person of the station; (d) a person identifying himself by having said individual information medium badge authorizing said person to use said station and inserting said badge into said reading device of said emitting unit of the station; (e) each station after receiving a coded call signal frequency modulated, emitting a reply signal to the conference initiating station indicating that it is ready to participate in the conference; (f) identifying a speaking person during the conference on the display unit of each station participating in the conference as soon as the speaker starts to speak; and (g) automatically switching on only one microphone as soon as the first words said by a person or speaker reach a sound volume exceeding a predetermined threshold, the other microphones then being automatically switched off.

According to another characterizing feature of the method according to the invention the identification of a speaker on the display unit of each station participating in the conference, as soon as the speaker starts to speak is effected by automatically transferring the coded information identifying the speaker recorded on his badge inserted into the reading device of his emitting unit to each said station participating in the conference.

According to another characterizing feature of the method according to the invention, it is possible to send at any time during the conference, from a station participating in the conference, a coded request signal for intervention of a person of that station, by displaying said request signal for intervention on the display units of the other stations participating in the conference, and permitting said person to speak upon the permission of the initiator of the conference.

According to another characterizing feature of the method according to the invention, it is further possible to emit at any time during the progress of the conference, from a station not invited to participate in the conference, a coded request signal for intervention of a person of that station, by displaying said request signal for intervention on the display units of the stations participating in the conference, and inviting said person to participate in the conference solely upon the permission of the initiator of the conference, the microphone of the requesting station being switched off as long as the station has not received a validation signal permitting said microphone to be switched on, and to prevent any person from disturbing the conference by entering into the network in an untimely manner.

According to another characterizing feature of the method according to the invention, it is further possible to connect together all the stations through special connections and simultaneously transmit, via spatial multiplexing, coded signals for the intervention of a speaker, call signals, reply signals, or request-for-intervention signals, and data signals.

According to another characterizing feature of the method of the invention, it is possible to transmit simultaneously, if appropriate, by using a suitable spatial multiplexing:

the coded signals of the speaker's intervention, the afore-metnioned calling signals and/or the aforementioned reply signals and/or the aforesaid requestfor-information signals, and data signals, by dividing into different channels the pass band from 300 to 3000 c.p.s. of an appropriate connection between two stations:

into a first channel ranging from about 300 to 2000 c.p.s. reserved for speech, into a second channel ranging from about 2000 to 2500 c.p.s. reserved for the transmission of data at 300 bauds, and into additional channels, for example four in number, ranging from about 2500 to 3000 c.p.s. reserved for the signalling constituted by the calling, reply and-/or request-for-intervention signals.

According to another characterizing feature of the method of the invention, it is possible, simultaneously with the transmission of a speaker's speech from one station to the other stations participating in a conference, to transmit data from a station participating or not participating in that conference through the medium of the afore-mentioned second channel to at least one station participating or not participating in the conference.

According to another characterizing feature of the method of the invention, the whole set of stations constituting a communication network is represented at each station by a synoptic panel reproducing the geographical limits of the network and indicating the location of the various stations of the network, each such location being represented for example by two light-emitting diodes of different colours illuminated either intermittently or fixedly depending upon the state of each station during the conference, thus allowing any person pertaining to a station to be informed rapidly and at a glance of the stations involved in the conference, of the state of each station participating in the conference and of the possible requests for intervention from stations forming part of the network and desiring to enter into the conference.

According to another characterizing feature of the method of the invention, a person not present in a station of a network may, by means, for example, of a portable emitting unit, connect to a station of the network through a telephone line of the switched network, in order to participate in a conference possibly started upon his initiative between several stations of that network.

The invention also has for a subject matter a device for carrying out the method according to the invention, the said device being provided at each station of the communication network.

Such a device is characterized by an equipment comprising at each station at least one emitting unit having a microphone, a receiving unit provided with a loudspeaker, a display unit including first light-emitting diodes, a reading unit for reading information from a badge bearing an individual information medium, said information including the name of a person possessing said badge for identifying said person during a conference, and interface units interconnecting said emitting unit, said receiving unit, said display unit and said reading unit to a telephone line, said communication network including a plurality of stations interconnected by telephone lines.

According to another characterizing feature of the device, the equipment located at a station may also comprise at each station a synoptic panel diagrammatically reproducing geographical limits of said network grouping several stations and indicating location of the various stations of said network, a plurality of second light-emitting diodes each representing a corresponding one of said stations and each providing a luminous state which indicates at any moment the state of the corresponding station during a conference, and control means for controlling said diodes according to the progress of a conference.

According to another characterizing feature of the device, the equipment of a station may also comprise a display board having a plurality of columns for displaying name of each station invited to join in a conference, name of the person or persons of those stations invited to participate in that conference, information indicating that called station has replied to the invitation to join in the conference, and information, in numerical form, for indicating a sequence number of a request for intervention originating from a person of that station.

According to another characterizing feature of the device, a person not present in a station of a communication network may possess a special equipment capable of being connected, by a telephone line of the switched network, to a station of a network, the said special equipment being constituted by at least one emitting unit, one receiving unit, one badge reading device, and an acoustic coupling to which is connected for example the handset of a conventional telephone.

BRIEF DESCRIPTION OF THE DRAWINGS

For a fuller understanding of the invention, reference is had to the following description, taken in connection with the accompanying drawings, in which:

FIG. 1 diagrammatically represents several possible configurations of communication networks between several stations to illustrate different possible applications of the invention;

FIG. 2 is a perspective view of a communication unit used in a station of a network;

FIG. 3 represents the main circuits of the communication unit of FIG. 2;

FIG. 4 is a perspective view of a more sophisticated embodiment of a communication unit used in a station of a network;

FIG. 6 is a block-diagram of each decoder circuit used in FIG. 5.

DESCRIPTION OF THE PREFERRED EMBODIMENTS

Figure 5:
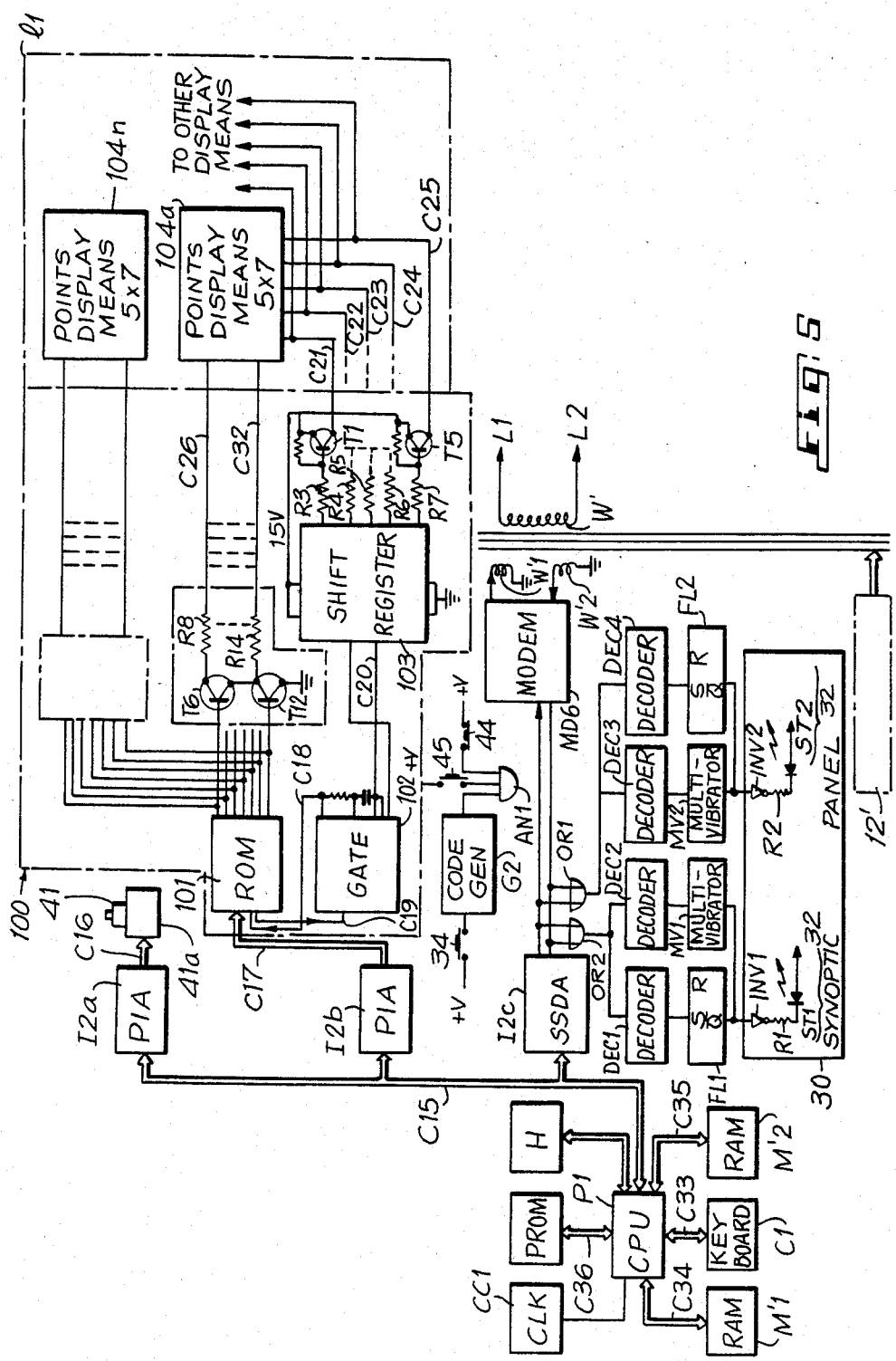
FIG. 5 represents the main circuits of the communication unit of FIG. 4.

Referring to FIG. 1, there are grouped into a communication network at least two stations ST1, ST2 interconnected connected either by the telephone line 2 of the switched network and a telephone control 3 having automatic switches, or by special connections 50 or 50'.

The equipment of a station ST1, ST2 comprises at least one communication unit U such as the one shown in FIG. 2, the same communication unit being designated by U1 in the station ST1 and by U2 in the station ST2.

Several network configurations may be contemplated within the scope of the invention:

(1) A bidirectional communication network between two persons of two stations among n stations ST1, ST2,...,STn connected by twos through telephone lines 2 of the switched network. FIG. 1 shows an example of such a configuration in which the communication unit U1 of station ST1 is connected through telephone control 3 and telephone line 2 to the other communication units U2, U3, U4, U5 of stations ST2, ST3, ST4, ST5, respectively. Of course, each other communication unit U of each respective station is also interconnected to the other communication units U of the other respective stations via a telephone control and telephone lines 2 but these latter have not been represented so as not to complicate the FIG. 1.

(2) A network of bidirectional communications between several persons of two stations among n stations ST1, ST2, ...STn connected by twos through the telephone lines 2 of the switched network. This configuration is identical to that described in the preceding case except that at least one station is equipped with several locally interconnected communication units U.

(3) A bidirectional communication network between two persons of two stations among n stations ST1, ST2,... STn connected by twos through special lines 50 or 50'.

Such a configuration is represented with the special line 50 shown in dark ink as interconnecting the communication unit U4 of station ST4 and the communication unit U5 of station ST5, or with the connection line 50' shown in a dashed line and interconnecting a communication unit U'1 of station ST1 with the communication unit U'2 of station ST2 (each communication unit U' being installed in at least one room of a station of the network as it will be explained in further details later ). Of course, all the other special connections 50 or 50' have not been represented for clarity purposes.

(4) A network of bidirectional communications between several persons of two stations ST4, ST5 among n stations connected by twos through special connections 50 or 50'. In the case considered, each station ST4, ST5 comprises several communication units U like the one illustrated in FIG. 2 or U' like the one illustrated in FIG. 4, the communication units U or U' being locally interconnected to the special lines 50 or 50'. This configuration has not been represented for clarity purposes but is obvious.

(5) A network of multidirectional communications between several persons of several stations among n stations ST1, ST2,...STn interconnected by special connections 50 or 50'. More precisely, FIG. 1 shows this communication network as comprising five stations ST1, ST2, ST3, ST4, ST5 arranged according to a star configuration with a control station ST3 connected to each of the other stations by a special connection 50 or 50' and a controlled switch 51, so as to allow any of these stations to call one or several other stations.

Referring now to FIG. 2 the communication unit U comprises:

- an alpha-numeric keyboard 4 and a numerical keyboard 5 constituted for example by push-buttons 6,
- a display unit 7 including for example light-emitting diodes and constituted for example by two display lines 7a and 7b,
- a conventional telephone handset 8 equipped with the transmitter capsule 9 and a receiver capsule 10,
- a two-position switch 11, and
- a set of control circuits diagrammatized in FIG. 3.

It is to be noted that keyboards 4 and 5 are conventional keyboards which deliver the eight bits of ASCII code (an abbreviation of American Standard code for information interchange defined by American National Standard Institution) each time a push-button 6 is pressed. Consequently, those known keyboards are not to be discussed in further detail.

As shown in FIG. 3, the said control or processing circuits comprise essentially a microprocessor P with the Central Processing Unit CPU which in the present case, is the Motorola 6800, a first storage set or directory store M1 (RAM memory) connected to the CPU by bidirectional connections C1, and a programmable read-only memory PROM connected to the CPU by bidirectional connections C2. The CPU is connected by bidirectional connections C3 to an interface circuit I1 which comprises three input—output circuits, i.e., a peripheral interface adapter I1a (PIA) which is the Intel 8355, the PIA I1b which is the Intel 8155 and the SSDA I1c (synchronised serial data adapter) which is the Motorola 6850-2. The structure of the PIA are well known as being programmable interfaces having bidirectional ports. In the present case, the ports PA and PB of PIA I1a are output ports connected to display means 7a, 7b through bidirectional connections C4, C5 with driver means D1, D2 interposed between interface I1a and the display means. It is reminded that the PIA 8355 has a ROM memory of 16 bits. The PIA I1b, which includes three ports, has port PA (output port) connected to the display means through bidirectional connections C6 and driver means D3, and its port PB (input port) is connected to a CMOS 4 bits microprocessor through unidirectional connection C7. This microprocessor MP, which for example is the COPS-420 manufactured by National Semi-conductor, is programmed so as to ensure the operation of the keyboards 4 and 5 and is thus connected to keyboard 4 via bidirectional connections C8 and to keyboard 5 via bidirectional connection C9. The port PC of interface I1b is, on the one hand, connected to microprocessor MP via bidirectional connections C10 and, on the other hand, to the display means through unidirectional connection C11 and driver means D4 (port PC being thus connected as input/output port or output port according to the control signals from microprocessor CPU).

The SSDA I1c is an interface which permits to connect a microprocessor to a MODEM (modulator-demodulator) so as to transmit data signals to a telephone line or to receive data signals therefrom. Thus, the output of this interface is connected to a modulator of MODEM MD1, the output of the modulator being connected to a terminal of winding W1 whose other terminal is connected to the ground. Winding W1 is inductively connected to an output winding W, the two terminals of which being connected to telephone lines L1, L2 as it will be further explained. Another winding W2, also inductively coupled to winding W, has one terminal to the ground whereas the other terminal is connected to the input of filter means F whose output is connected to the demodulator of MODEM MD1. Said demodulator is connected to the input of interface I1c, filter means having a frequency band width sufficiently narrow so as to pass data signals only.

The bidirectional connections C1, C2, C3 are the schematic representation of bus lines including data bus, address bus and control bus necessary for the operation of the microprocessor system.

The communication unit U also comprises a read unit 15 for reading a recording medium 16 such as a badge when the latter is inserted into a slit 17 of the unit U (FIG. 2). The read unit 15 may be the Magnetic Stripe Read model MSR-210N manufactured by Nippondenso and which reads ABA standard cards.

On the badge 16 is thus magnetically recorded coded information personalizing a person and particularly the name of the person to whom this badge is attributed. This card reader 15 is connected through unidirectional connections C10 to the display means 7a, 7b and to the telephone lines L1, L2 through the medium of a MODEM MD2 inductively coupled to winding W via winding W3. The reader 15 is also connected via unidirectional connection C11 to buffer means B1 whose output is connected to MODEM MD3 connected to telephone lines L1, L2 via inductive coupling provided with windings W4 and W. The switch 11 controls an address generator G1 which is connected to the address input of buffer means B1, switch 11 being a simple on-off switch. The switch 11 allows the transfer of the person name recorded on the badge 16 to the telephone lines L1, L2 when that person makes a request for intervention.

As also appears from FIG. 3, the communication unit U may advantageously be connected through bidirectional connections C12 to a recording unit 20 and a printing unit 21. The recording unit 20 allows the recording on a magnetic medium of messages transmitted to the communication unit U with or without simultaneous printing in the printing unit 21. The recording unit 20 may be the PEARLCORDER whereas the printing unit 21 may be the printer unit of CANON COMMUNICATOR manufactured by Canon, and which is controlled by a single MOS-LSI HD35113P receiving at its inputs the data signals transmitted on connections C12. It is to be noted that the printing unit includes a thermal head with thermal print paper. The recording unit 20 is connected through bidirectional connections C13 to a MODEM MD4 which is connected to the telephone lines L1, L2 through coupling windings W5 and W. The printing unit 21 is connected to a MODEM MD5 via bidirectional connections C14 and to telephone lines L1, L2 via coupling windings W6 and W. Moreover, these auxiliary units 20 and 21 are connected to the keyboards 4, 5 via microprocessor MP to control the said auxilliary units through the connections C12.

Referring again to FIG. 2, a communication unit U also comprises three control lines V1, V2, V3 located in proximity to the display unit 7 and whose function will be explained later. The said lines are notably intended to indicate the situation of the telephone lines L1,L2 connecting the communication unit U to at least one other communication unit of another station.

Before describing the other FIG.s, it is important to point out that the various communication stations grouped within one and the same entity referred to as a network are in fact located at different geographical locations of the same country or of the same region of that country. It is therefore interesting and advantageous, according to the invention, to represent this network in each station of the network or at least at the main station thereof by means of a synoptic panel diagrammatically reproducing the geographical limits of the network and indicating the location of the various stations of that network.

Such a network representation is contemplated in the improved communication unit illustrated in FIGS. 4 and 5, which unit may be used as a complementary means to the communication unit described in connection with FIGS. 2 and 3.

The synoptic panel 30 shown in FIG. 4 is placed within the room of the station. On this panel are diagrammatized the geographical limits of a network comprising several stations, such as a hexagon 31 simulating for instance the geographical limits of France, within which are indicated three stations ST1, ST2, ST3 symbolizing three towns constituting a network. Each station is represented on the synoptic panel 30 by display means constituted for instance by two light-emitting diodes 32, 33 located in proximity to one another, one of the said diodes diffusing for instance a red colour and the other diode diffusing for instance a green colour. Associated with each pair of diodes 32, 33 representing stations, is a pair of control means 34, 35 such as push-buttons for controlling the illumination of the two diodes, respectively. The function of these two diodes will be explained later.

The synoptic panel 30 therefore forms part of communication unit U' installed in at least one room of a station of the network.

The communication unit U' is completed with at least one integrated set of devices 36 placed on a support 37 such as a table located substantially opposite the synoptic panel 30. The set 36 includes a display unit 7 with two lights 7a, 7b, a switch 11, a unit 15 for reading the badge 16, which elements correspond and fulfill the same function as those of the communication unit U represented in FIGS. 2 and 3. The set 36 also comprises an emitting unit constituted by a microphone 9 supported by an upright 39 and fulfilling the same function as the transmittor capsule 9 of the communication unit U of FIG. 2. The receiver unit is constituted by a central loud-speaker placed at an appropriate location in the room containing the communication unit U', and fulfilling the same function as the receiver capsule 10 of the communication unit U of FIG. 2.

The communication unit U' is advantageously completed with a projection device 41 allowing the photograph of the person speaking at a given moment to be displayed or projected on a screen 42, and with an alpha-numeric display board 43 provided with several lines l1 to ln and several columns, for instance four in number, from c1 to cn, for the supply of information on the state of the conference, as will be described later.

To facilitate the starting of a conference from such a communication unit U', the latter is equipped with three control means 44, 45, 46, each constituted by a push-button located for instance at the lower portion of the synoptic panel 30. The functions of these push-buttons will be explained later. It is to be noted that these control means 44, 45, 46 are also provided on keyboard 4.

Referring to FIG. 5, there are diagrammatically shown the main connections between the constituent elements of a communication unit U' with a telephone line L1, L2 connecting this unit to at least one other unit of a network.

The communication unit U' includes, a microprocessor P1 using, for example, the Motorola 6800 CPU, which is connected through bidirectional connections C15 (including data bus, address bus, and control bus) to interface circuits I2a, I2b and I2c. Circuits I2a and I2b are peripheral interface adapter (PIA) such as for example Motorola 6820 PIA. Interface I2c is the Synchronous Serial Data Adapter (SSDA) identical to the SSDA shown in FIG. 3.

Interface circuit I2c is connected to a MODEM MD6 coupled to telephone lines L1, L2 via winding W'1, W'2 and W'. The input and output of interface circuit I2c are respectively connected to the two inputs of two OR gates OR1, OR2. The output of gate OR2 is connected to the input of decoder means DEC1 and DEC2, whereas the output of gate OR1 is connected to the inputs of decoder means DEC3 and DEC4. The output of decoder means DEC1 is connected to the input of a RS flip-flop FL1 and the output of decoder means DEC2 is connected to the input of a multivibrator MV1. The two outputs of flip-flop FL1 and multivibrator MV1 are connected together to the input of an inverter gate INV1 connected via a resistance R1 to the cathode of a light-emitting diode 32 associated to a station ST1 of synoptic panel 30.

The output of decoder means DEC3 is connected to the input of a multivibrator MV2 whereas the output of decoder means DEC4 is connected to the input of a RS flip-flop FL2. The outputs of multivibrator MV2 and flip-flop FL2 are connected together to the input of an inverter INV2 connected to the cathode of a light-emitting diode 32 via a resistance R2, diode 32 being associated to the station ST2 represented in synoptic panel 30.

In order not to complicate the drawing of FIG. 5, the connection of a diode 32 associated to the station ST3 to circuit interface I2c via an OR gate, decoder means, multivibrator, RS flip-flop, inverter means and resistance have not been represented. It is obvious that there are as many diodes 32 connected to circuit I2c as there are stations STn represented on synoptic panel 30.

Each push-button 34 which is a simple on-off switch is connected to the input of a code generator G2 whose output is connected to a first input of an AND gate AN1. A second input of gate AN1 is connected to the push-button 45 which is also a simple on-off switch and a third input of gate AN1 is connected to the push-button 44. At the rest state, push-buttons 34 and 45 are off whereas pushbutton 44 is on. The output of gate AN1 is connected to the input of MODEM MD6.

Interface circuit I2a is connected through unidirectional connections C16 to a control device 41a of the projector 41. This projector may be the AUDIOCARD projector used in audiocard system A87 proposed by REVOX, such as projector permitting to project on the screen 42 an image of 100×70 cm at a distance of 2 meters and an image of 127×180 cm at a distance of 3 meters, the images projected on the screen 42 being those of diapositives or dials representing the person who is speaking.

Interface circuit I2b is connected through unidirectional lines C17 to a circuit 100 for displaying ASCII characters appearing on display board 43.

The circuit 100 comprises a ROM memory 101 which receives data signals representative of ASCII code from interface circuit I2b, a gate 102 (for example a 7400 gate) having an output line C18 connected to the clock input of the internal counter incorporated within the memory 101 which is a character generator. The counter output is connected to the input of the gate 102 through connection C19. For instance, the memory 101 is the MK2302 memory of Mostek. The clock output of gate 102 is connected to a shift register 103 through line C20. Shift register 103 has five outputs connected via resistances R3-R7 to base electrodes of buffer transistors T1 to T5 whose collector electrodes are connected via conductors C21 to C25 to the five columns of a display means 104a of the type having 5×7 points or elements, such a display means being well known in the art. The seven outputs of memory 101 are respectively connected to the base electrodes of PNP transistors T6-T12 having their collector electrode connected together to the ground whereas their emitter electrodes are connected via resistances R8-R14 and conductors C26 to C32 to the seven lines of display means 104a. For example, display means 104a is the MAN2A of MONSANTO. Of course, the seven outputs of memory 101 and the five outputs C21 to C25 are also connected to other display means according to the number of display means necessary for displaying the information appearing on display board 43 (in the drawing, the last display means 104n being represented). In summary, the input ASCII code is supplied to ROM memory 101 which generate the control signals on lines C26-C32 for scanning the seven lines of the display means. The columns of display means are scanned or swept from gate 102 with shift-register 103 and via buffer transistors T1-T5. As explained hereabove, ROM memory 101 is a character generator having an internal counter which provides the scanning cycle, whose rate is provided by the time constant of gate 102. It is to be noted that in FIG. 5 only the display means 104a - 104n of a line l1 of board 43 have been represented but it is obvious that the other lines l2 to ln and the columns c1 to cn are also provided with identical display means connected to control circuit for displaying identical to circuit 100.

The communication unit U' further includes a control unit C1 connected to microprocessor P1 via bidirectional connections C33, a ROM memory M'1 connected to the microprocessor P1 through bidirectional connections C34 and a RAM memory M'2 connected to said microprocessor through bidirectional connections C35. The microprocessor P1 is clocked, as microprocessor P, by a clock circuit CC1. A PROM memory is also connected to the microprocessor via bidirectional connections C36. Of course, PROM memory and memories M'1, M'2 are identical to corresponding memories associated with the CPU of microprocessor P.

The operation of the different bidirectional communication networks will now be explained from communication network previously defined in Item (1) with some further explanations with regard to the other bidirectional networks defined in Items (2) to (4) since they operate in a like manner. As to the communication network defined in Item (5), it will be explained in detail later.

Let us assume that each of the stations ST1, ST2,... STn is equipped with a communication unit U such as the one shown in FIG. 2, and that a person P1 of the station ST1 wishes to get in touch with a person P2 of the station ST2. This person is included in the repertory of the memory M1 which contains all the known users likely to be called. Each user is identified for instance by his individual or legal name, a prefix, for instance his initials, and his telephone number. This repertory is sequentially formed and stocked in memory M1 on the control of a first main Program memorized in PROM memory and whose different depressions are processed by CPU of processor P, with eventually seconds interuptions. For entering each personalized information in memory M1, it is sufficient to press character by character this information on alphanumerical keyboard 4 (for the prefix, the name and the telephone number of the person). As soon as these characters are composed on the keyboard, they are displayed to display line 7a for verification. During the constitution of this repertory, the handset 8 of the communication unit U1 is not lifted so that no emitting signal is transmitted from telephone handset 8. Once the repertory memory is formed, the person P1 may try to obtain a telephone communication with the person P2. Normally, the person P1 first personalizes the microphone and the communication unit U1 by inserting his badge 16 into the reader 15, and the communication with the person P2 is established as follows:

the person P1 lifts the handset 8 and begins to depress on the alpha-numeric keyboard 4 of the communication unit U1 the keys corresponding to the initials of the name of the person P2 (for example, if the name of this person is Robert Dupont, the initials are RD). These characters are compared one by one to the characters of the name of the persons previously recorded in the memory M1 of the processor P (FIG. 3 ) and which include the name of the person P2. This abridged name search is carried out through the medium of a second Program pre-recorded in PROM memory of the processor P.

Once the telephone number of the person P2 is automatically found in the memory M1 without the person P1 having depressed all the characters forming the name of the person P2, the telephone connection is established automatically with the person P2. This stage in fact amounts to sending a coded call signal, for example a 8 bits code, from the station ST1 to the station ST2. More precisely, the 8 bits coded signal is supplied to interface circuit I1c through bidirectional connections C3 which is of course addressed by processor P. The modulator of MODEM MD1 receives the various data from interface I1c and modulates them, the modulated signals being transmitted to telephone lines L1, L2 through coupling windings W1 and W.

At the station ST2 this call signal may merely result in a conventional ringing.

A person of the station ST2 warned by this ringing replies to this call signal by merely picking up or lifting the handset 8 of the communication unit U2 of the station ST2 so as to communicate with the person P1.

If the person at the station ST2 has previously personalized the microphone of the unit U2 of this station by inserting his badge 16 into the reader 15, the coded information on his name is automatically displayed on the display line 7a of the communication unit U1 of the station ST1 as soon as this person begins to speak. This is realized with the control device 12 of FIG. 3. This control device comprises an operational amplifier AMP1 used as threshold detector and having its input connected via a contact relay RL2 to emitting capsule 9 of the telephone handset 8. The output of amplifier AMP1 is connected to the input of a control means 121 such as an AIM65 and to a resistance R connected to a ground. An adjustable resistance or potentiometer PT1 is connected to amplifier AMP1 so as to adjust the gain thereof. The input of amplifier AMP1 is also connected to the input of an operational amplifier AMP2 whose output is connected to the input of filter means 120 via relay contact RL3. The output of filter 120 is connected either to an operational amplifier AMP3, or to an operational amplifier AMP4 via relay contact RL3 simultaneously actioned with contact relay RL3 at the input of filter 120. A potentiometer PT2 is connected to amplifier AMP3 for adjusting the gain thereof and the output of amplifier AMP3 is connected to receiver capsule 10 via relay contact RL1. The output of amplifier AMP4 is connected to telephone lines L1, L2 through coupling windings W7 and W. A connection C37 has one terminal connected to the input of filter 120 via relay contact RL3, the other terminal being connected to a winding W8 receiving voice signals from lines L1, L2 connected to winding W.

Control means 121 is connected through connections C38 to a MODEM MD7 wherein the modulator is coupled to the telephone lines L1, L2 via windings W9 and W. A winding W10, coupled to telephone lines L1, L2 via winding W is connected to the input of filter means 122 whose output is connected to the demodulator of MODEM MD7 connected to control means 121. The outputs of control means 121 are connected to driver means D5 for controlling relay contacts RL1 to RL3 whereas another outputs of said control means 121 are connected through driver means D6 and unidirectional connections C39 to code reader 15 for the control thereof as explained later. Thus, when the person P2, after having personalized his microphone, begins to speak (relay contact RL2 being on at its rest state) with for example the first words said by this person having a sufficient sound volume, amplifier AMP1 used as threshold detector has its output at a high level which causes control means 121 to output control signals from driver means D5 which leads relay contacts RL3 to connect in series amplifier AMP2, filter means 120 and amplifier AMP4. Thus, as soon as the person begins to speak, his voice is transmitted to telephone lines L1, L2 via windings W7 and W. At the same time, signal controls are output from driver means D6 for controlling code reader 15 so that the coded information on the name of the person P2 be automatically displayed on the display line 7a of the communication unit U2 of the station ST2 and be transmitted through MODEM MD2 and windings W3 and W to telephone lines L1, L2 towards station ST1 so that the name of the person P2 is automatically displayed on the display lines 7a of the communication unit U1. For that, the coded information is received by winding W1 of communication unit U1 and transmitted to processor P via MODEM MD1 and interface circuit I1c , which processor controls the displaying on display lines 7a of the name of the person P2 via circuit interface I1a and driver means D1. It is to be noted that at the control step of code reader 15, the coded information of the name of the person who is speaking is bufferized in buffer means B1.

Consequently, once the person P2 has been identified by the person P1, the telephone conversation may normally be established between them with simultaneous display of the speaking persons or the speaker's name on the display line 7a of the communication units U1 and U2.

According to another important feature of the present invention, it is possible to automatically re-call a user. More precisely, once the search of a user is performed by emitting his telephone number on the telephone lines L1, L2, it is possible to automatically recognise the tone identifying a no -reply signal and the tone identifying a busy line signal. A tone detector is for example described in U.S. Pat. No. 3,790,722 and has not thus been described in more detail. Thus, in the case of no-reply signal, the user can be called again only by sending a complete code sequence as defined previously. In the case of a busy line signal, the personalized information of the user is identified in the memory M1 is transferred to a second memory M2 shown in FIG. 3 and connected to CPU via bidirectional connections C40.

Of course, the second main automatic call program of a user recorded in the memory PROM is modified accordingly, the first main program being attached to the constitution of the repertory.

The memory M2 has a low capacity and in practice it is possible to record therein four personalized information in order not to complicate the system. When at least one personalized information is recorded in this memory, the device U associated with the telephone handset 8, when it is in a free state, can automatically re-emit on the telephone lines L1, L2 the telephone number contained in this personalized information. Simultaneously, the user of the handset 8 is warned by the personalized information displayed on the display unit 7.

In the case of such an automatic call sequence, it may be advantageous to display on the display unit 7 simultaneously all the personalized information elements recorded in the memory M2 to know the contents of the latter.

To recognise the particular user who is recorded automatically, the corresponding personalized information may be distinguished from the others on the display unit 7 for instance by super printing.

When there are several personalized information elements recorded in the memory M2, the program managing the automatic re-emission of a telephone number takes into account these various information elements sequentially so as to observe an imposed time delay between two successive emissions of one and the same telephone number.

Of course, the user of the communication unit U1 can at any moment interrupt the automatic call sequence of another user and employ his telephone unit in a conventional manner. Moreover, the personalized information contained in the memory M2 may at any moment be erased from this memory.

According to another important characterizing feature of the method of the invention, the user of the communication unit U may form a personalized information on a new user, without necessarily entering this information in the repertory of the memory M1. The new personalized information is recorded in a third memory (which may itself be constituted by the memory M2). Once the telephone connection is obtained with this new user whose telephone number has been formed manually on the numerical keyboard 5 and depending on whether this conversation is interesting or not, the user of communication unit U can decide to transfer or not the personalized information on this new user into the repertory of the memory M1, by pressing on the push-buttons of keyboard 5 the name of the new user or preferably this name preceding of the initials of his first name.

The procedure described for allowing a person P1 of a station ST1 to communicate with the person P2 of a station ST2 applies also in the case of a network of bidirectional communications described in Item (2). However, since at least one station is equipped with several locally interconnected communication units U (FIG. 2) and since several persons of this station may participate in a conference between two stations, the calling of these persons by the initiator of the conference located at the other station can be performed in several manners. One of them merely consists in emitting the call signal from one station to all the communication units U of the called stations, or in providing an operator at the called station to effect the transfer of the call signal through only some of the communication units U after communicating with the initiator of the conference naming the persons whom he actually desires to call.

Each called communication unit answers to the call signal as in the present case. Of course, each called communication unit U of a station is inductively coupled to telephone lines L1, L2 as shown in FIG. 3.

In the network configuration of Item (2), the fact must be taken into account that several called persons may intervene simultaneously. According to the invention, a single person cannot intervene at a time, and this reult is obtained by the fact that as soon as a person or speaker begins to speak, only his microphone is switched on, the microphones of the other communication units are automatically and temporarily switched off, on condition, however, that the first words said by this person have a sufficient sound volume. This selection is effected by control means 121 of circuit 12 of each station (FIG.3). When the person begins to speak, his voice is transmitted to telephone lines L1, L2 through winding W7 as already explained hereabove and MODEM MD7 under the control of control means 121 emits a coded data signal to the other station. This coded signal may be an address signal which is decoded at the receiving station (station ST2) by decoder means interposed between control means 121 and MODEM MD7. When receiving this address signal, control means 121 of communication unit U2 then outputs control signals supplied to driver means D5 which act upon relay contact RL2 so as to disconnect emitting capsule 9 from amplifier AMP2 so that communication unit U2 is automatically and temporarily switched off.(In this case contact RL1 is on).

Of course, the display unit 7a of each communication unit of the conference displays at any moment the speaker's name.

It is important to note that, by means of an appropriate spatial multiplexing, the pass-band from 300 to 3000 c.p.s. of each telephone lines 2, 50 or 50' is divided:

- into a first channel from about 30 to 2000 c.p.s. reserved for speech transmission,
- into a second channel from about 2000 to 2500 c.p.s. reserved for data transmission at 300 bauds, and
- into several additional channels, for instance four in number, from about 2500 to 3000 c.p.s. reserved for transmission of call signals, reply signals and/or request-for-intervention signals.

It should be noted that the pass-band may be divided differently or a channel may be provided or subdivided into several channels. There may thus be provided a channel for instance in the range of from 900 to 1100 c.p.s. as for telewriting.

Of course, the filter means F, 120 and 122 are arranged to correspond to the above-mentioned pass-band. Thus, filter F has a pass-band reserved for transmitting or receiving call signals, reply signals, filter 120 has a passband reserved for speech and filter 122 has a pass-band reserved for the data signals.

Such a multiplexing, especially when the communication is established between the persons P1 and P3, allows one of them to simultaneously transmit data to the other person by using the afore-mentioned second channel. These data may be typed out directly on the alpha-numeric keyboard 4 of the communication unit U. These data, are for example transmitted through connections C12 to a MODEM MD8 connected to filter means F1 having pass-band for data signals, the output of filter F1 being connected to a winding W9 coupled to winding W. These data may be received on the receiving communication unit in several manners.

they may be displayed on the display line 7a of the unit U, or be simultaneously recorded in the recorder 20 of the unit (FIG. 3) on the magnetic medium such as a cassette (a filter not represented being then interposed between MODEM MD4 and winding W5), and or be simultaneously printed on the printing unit 21 (another filter, not represented, being interposed between MODEM MD4 and winding W5).

On the emitting side, these data, before being transmitted, may be previously recorded in the recorder 20 of the emitting unit.

These data or messages may be transmitted by one station to another without these two stations being in oral communication. In this case, the message is automatically recorded on the recording unit 20 of the receiving station. If the recording medium is constituted by, for instance, a cassette which, consequently, can record several messages, it is advantageous, according to the invention, to simultaneously print on the printing unit 21 the name of the addressee of this message together with the numerical indication of the position of the beginning of the message on the cassette.

As a measure of safety, the person desiring to become acquainted with a message, can do so only after inserting his badge 16 into the reader 15 in order to be sure that the said message will be delivered on the printing unit 21 or display line 7a to the person for whom the message is actually intended. To this end, the beginning of the message is always preceded by the name of the addressee, which name is thereafter compared with the name recorded o the badge 16 of the person wishing to become acquainted with the message.

It is also important to note that in all the configurations where several persons have initially been called to participate to a conference, any person who has not been called initially cannot intervene in this conference, unless he has asked to do so during the conference by the initiator of the conference.

All the above procedures also convern the networks of bidirectional communications described in Items (3) and (4).

On the other hand, it is possible for any person participating in a conference established between two stations (for example ST1, ST3) to emit a request-for-intervention signal together with a display of that person's or speaker's name on the display line 7a of all the communication units U participating to that conference.

This operation is performed merely by actuating the switch 11 of the communication unit U, the person having previously inserted his badge 16 carrying his name into the reader of his unit. Since the conference has started, the code of the name of the person desiring to speak is bufferized in buffer means B1. As soon as the switch 11 is actuated, the address generator G1 addresses buffer means B1 so that the coded signal of the name is transmitted to the other unit or units of the conference through MODEM MD3, windings W4 and W and telephone lines L1, L2, without however disturbing a communication in progress. The initiator of the conference can thereafter allow this requesting person to speak as soon as he deems it appropriate. Of course, the requesting person may choose to start speaking of his own accord through the medium of his own microphone (emitting capsule 9 of the telephone handset 8 of the communication unit U), but this type of intervention must be exceptionally used because of the risk to pertubate the normal progress of the conference.

When several different persons already included in the conference send a request-for-intervention signal, all such requests appear on the display line 7a of all the units participating in the conference. Of course, such displaying is limited by the displaying capacity of that display line which may comprise for instance 32 characters and be considerably increased by providing a succession of characters. Since the speaker's name is also displayed on the display line 7a, the names of the requesting persons appear after the name of the speaker and constitute a list of persons waiting for intervening. This list may be memorized in an accumulator which is incremented at each request-for-intervention signal. It is possible to erase in the accumulator the request-for-intervention, the list being then implemented. Moreover, any person participating or not participating in the established conference may at any moment transmit data through the second channel to one or several persons without verifying if first data transmission channel is free, the information being bufferized.

No person not having been asked in participate to the conference can directly enter into this conference. However, this person can inform the participators in the conference of his desire to enter into the conference. To this end, and after having introduced his badge 16 into the reader 15 of his communication unit, the requesting person actuates the switch 11, thus causing his name to be transmitted to the display line 7b of each communication unit U participating in the conference. Thereafter, the initiator of the conference can validate the microphone of the requesting communication unit by sending a validation signal transmitted by an afore-mentioned additional channel.

To improve the processing of requests for intervention from persons who have or have not been invited to a conference already in progress, each communication unit U (FIG. 2) is provided with three light signals V1,V2,V3.

When the light signal V1 is on, it means that the channel reserved for speech transmission is busy. When the light signal V2 is on, it means that the data transmission channel is busy. When the light signal V3 is on, it means that the channels for the transmission of signalling signals are busy. By these means, a person participating or not participating in a conference already established, can modulate his action in accordance with the state of the said light signals. Of course, it is possible for this requesting person to transmit data at any moment in the stations participating in the conference, without however directly intervening in that conference.

The network of multidirectional communications referring to Item (5) at the beginning of the present description, will now be described in detail.

The principles of the establishing and progress of the conference are effected as in the previous cases, with the same limitations for a person wishing to intervene in this conference without having previously asked to do so.

Let us now assume that at least some of these stations such as the stations ST3, ST4 and ST5 are equipped with a communication unit U' such as the one described in FIGS. 4 and 5.

This particular network is diagrammatized on the synoptic panel 30 of the stations ST1, ST2, ST3.

Let us assume that a person of the station ST1 or control station desires to start a conference with persons located at the stations ST2 and ST3. The conference is started as follows:

the initiator of the conference takes place in front of the synoptic panel 30 of his communication unit U' and can act in three different manners after having preferably personalized his microphone 9 by inserting his badge 16 into the reader 15 of the assembly 36;

(a) he may depress the push-button 44 of the synoptic panel 30, the function of which is to allow a general call to be addressed to all the stations of the network, for instance to the stations ST4 and ST5 in the example considered. Of course, push-button 44 is in connection with CPU of a processor P1 which automatically transmits, under the control of a program memorized in PROM memory, the coded data signals representative of the names of the regions where are located the stations to be called to the interface circuit I2c wherein the coded signals are memorized (the codes of the names of the regions being memorized in memory M'1). In fact, the coded signals are address signals each representative of a station. It is to be noted that the choice or selection of stations to be called is previously performed by taking into account of the program in PROM memory. After actuating the push-button 44, the initiator of the conference depresses the push-button 45, which is an execute push-button, that is to say, the communication unit U' of the station ST3, the push-button 45 is also connected to CPU of processor P1 which, in response to the depression of said push-button instructs interface circuit I2c to transmit to telephone lines L1, L2 through MODEM MD6 and windings W'1 and W' the address signals of stations ST2 and ST3. This coded call signal is displayed on the synoptic panel of the station ST1 and of the stations ST2, ST3. Indeed, at the emission step of the address signals, which are different from each other, from interface circuit I2c to MODEM MD6, these signals pass through OR gates OR1 and OR2 towards decoder means DEC1-DEC4. Decoders DEC1 and DEC2 receive for example the address signals of station ST1 whereas the decoders DEC3 and DEC4 receive the address signals of station ST2. Furthermore, in each coded address signal is inserted one bit distinguishing an address signal at the emitting mode from the same address signal at the receiving mode. More precisely, since it is the station ST1 which addresses a general call to stations ST2 and ST3 the address signal of station ST1 includes the differentiating bit. This address signal is thus decoded by decoder DEC1 but not by decoder DEC2. Consequently, decoder DEC1 sets RS flip-flop FL1 causing the Q output thereof to go low. The diode 32 of station ST1 is then illuminated fixedly and diffuses a red light. The address signal of stations ST2 and ST3 which are received stations are coded signals which do not include the differentiating bit so that decoder DEC3 of station ST2 (and also the corresponding decoder of station ST3) receives said address signal which is thus not decoded by decoder DEC4. Decoder DEC3 thus controls multivibrator MV2 so that the diode 32 of called station ST4 is illuminated in an intermittant manner and diffuses a red colour. At the receiving stations ST2 and ST3, the same process is realised. The address signals are received by winding W'2 and MODEM MD6 which transmit them to the inputs of gates OR1 and OR2 of the communication units U2 or U3. The coded address signals are then transmitted to decoder means so that the diode 32 of the station from which the call signal has issued and represented to synoptic panel 30 of station ST2 or ST3 is illuminated fixedly whereas the diode 32 of each called station is illuminated in an intermittant manner and diffuses a red colour. In summary, the call signal is displayed on the synoptic panel of the stations ST1, ST2, ST3, that is to say, the diode 32 of each coded station is illuminated in an intermittant manner and diffuses a red colour, whereas the diode 32 of the station from which the call signal has issued is illuminated fixedly and also diffuses a red light;

(b) or he may depress the general call push-button 44 which allows a general call to be addressed to the stations ST2 and ST3 as explained in case (a) and then depress the push-button 46 which allows the initiator of the conference to remove certain stations which he does not wish to include in the conference. To effect this removal, the initiator takes place in front of synoptic panel and depresses the control button 34 of the intermittently illuminating diode 32 of each station which he desires to eliminate, thus extinguishing the diode 32 associated with the control button 34. Of course, such a cancelling step is effected under the control of the program memorized in PROM memory. Thereafter, the initiator of the conference depresses the push-button 45 to validate the conference, the said validation resulting in a reproduction of the information of the synoptic panel of the emitting station on the synoptic panels 30 of the called stations in accordance with same process as in case (a);

(c) or he may depress the control button 34 of each station which he desires to call so as to intermittently illuminate the corresponding diode 32 of the synoptic panel 30. More precisely, the depressing of button 34 causes generator G2 to emit a coded address signal to be emitted at the input of AND gate $AN_1$. He thereafter depresses the execute push-button 45 so that each address signal of corresponding station be emitted to telephone lines L1, L2 via MODEM MD6 and to inputs of OR gates OR1 and OR2. The same process as previously stated occurs for the decoding mode of each address signal.

In the present case, if the three stations ST1, ST2, ST3 constitute the network, it is sufficient to effect a mere general call with each address signal from the station ST1, to call the two other stations.

Any person then located in proximity to the synoptic panel 30 of the called communication unit U' is informed, by interrogating the said synoptic panel, of a call issued from another station. The station emitting a call signal is necessarily identified by the fact that the one of the stations represented on the synoptic panel 30 has its diode 32 illuminated fixedly and diffusing a red light. The person present in front of the synoptic panel 30 can also become aware that his station is called by the mere fact that the diode 32 representing that station on the synoptic panel 30 is illuminated intermittently and also diffusing a light of red colour.

Under such conditions, any person located in proximity to the synoptic panel 30 of a called station can, by means of this panel, know the origin of a call signal and the invitation made to this station to participate for instance in a conference, and to be informed of all the stations invited.

In reply to this call, each called station transmits a reply signal to the station from which the call has originated. To this end, it is sufficient for a person of a called station to depress the control button 34 associated with the diode 32 representing his station on the synoptic panel 30 and to also depress the push-button 35, in order to render the illumination of this diode continuous. Of course, the reply signal is the address signal not having the differentiated bit which is for example received by decoder DEC4 setting RS flip-flop FL2 so that the output Q thereof be at a low state. Once this operation is arried out, all the diodes 32 of the synoptic panels 30 of all the stations which must participate in the conference are illuminated continuously.

Once the establishing of the conference is thus performed and displayed on each synoptic panel 30 of the invited stations, the conference proper can start. At the outset, the diode 33 of the synoptic panel, which represents the station from which the call has issued, is illuminated fixedly and diffuses a green light. This can be performed with decoder means associated with each diode 33 like the decoder means DEC1-DEC4 associated with the diodes 32 of stations ST3 and ST4. These decoder means have not been represented for the clarity. This information is also reproduced on all the synoptic panels 30 of the stations asked to participate in the conference. This means that the initiator of the conference is ready to speak. As explained hereabove, a single person can speak at a time, the other microphones 9 of the other stations being automatically switched off. Of course, a control circuit 12' equivalent to control circuit 12 of FIG. 3 is also incorporated in communication unit U' of FIG. 5. As soon as a person participating in the conference desires to speak, he can do it directly by speaking before his microphone 9, pre-validated by his badge, from the very moment the first words uttered have a sound volume exceeding a predetermined threshold, the microphone 9 of the person who was speaking is then switched off. Of course, in order to keep his microphone 9 switched on, it is not necessary that all the following words have a sound volume exceeding the said threshold.

On the other hand, if a person participating to the conference wishes to intervene without necessarily interrupting the conversation already in progress, he makes his request known either by actuating the switch 11 of the set 36 associated with his microphone 9, or by depressing the control button 35 of the diode 33 of the synoptic panel 30 representing the station where that person is located. The purpose of either of these operations is to intermittently illuminate the corresponding diode 33 (green colour). This information is also transmitted to all the synoptic panels 30 of the stations participating in the conference and the name of the requesting person is displayed on the display line 7b of each set 36 of the stations 36 participating to the conference. Thus, all the persons of the other stations are informed of this request for intervention with an identification of the station from which the request originates. When this request is validated, for instance by the initiator of the conference, the corresponding diode 33 representing the station from which the request originated illuminates fixedly (green colour). This is effected automatically as soon as the person starts to speak before his microphone 9. Thus, on each synoptic panel 30 of the stations participating to the conference, a single diode 33 can be illuminated continuously (green colour), thus allowing the speaker's station to be identified. Any person participating or not participating in the conference can transmit data or messages to at least one station participating or not participating in a conference in progress.

Any person of a station not participating in a conference and being informed of that conference through the medium of the synoptic panel 30 of the station can make a request for intervention in the conference, by displaying his request on the synoptic panels 30 of the stations participating in the conference. The entry into the conference of the requesting station can take place only after the validation of his microphone 9 by one of the stations participating in the conference, so as to avoid untimely interventions in the conference in progress. Of course, the speaker's name during the conference can display on the displayed line 7a of each set 36 of the stations participating in the conference.

Up to the present, the initiator of a conference calls in a first stage a station, then in a second stage the person or persons of those stations asked to participate in the conference by conversing with the persons of the called stations who have answered his call.

It is possible, however, to call namely and directly the persons invited to participate in a conference. Referring to FIG. 5, a communication unit U' may be equipped with a microprocessor P1 containing a set of call programmes. From a control unit C1, the initiator of a conference taps out, for instance, on a keyboard of that control unit, or on the keyboard 4 of the communication unit U of FIG. 2, a program number. The corresponding program contains the names of persons who can be called directly, the names of those persons and the names of their stations appearing clearly on the different lines of the display board 43 of FIG. 4, with automatic indication of the stations called on each synoptic panel 30 of those stations will the previously defined conventions for the illumination of the diodes 32 and 33 representing said stations.

As already explained the board 43 comprises several lines l1 to ln and four columns c1 to cn. One line of the board 43 is attributed to a station, the first column indicating by the illumination of a character (for example X) the reply of the called person (the synoptic panel 30 indicating only the station), the second column displaying the name of the station where the called person is located, the third column displaying the name of the called person, and the fourth column displaying the priority number, during the conference, of the requests for intervention of the called persons, this number being dimensioned by one unit when the request for intervention from another person is satisfied or when the author of a request for intervention has cancelled his request, e.g. by moving the switch 11 of his communication unit U' back to its initial position. The circuit 100 shown in FIG. 5 has not to be discussed in further detail and in the operation of the circuit is obvious for a man skilled in the art.

Advantageously, the speaker's photograph is displayed on the screen 42 by means of the projector 41 provided with a file (FIG. 5) in which are stored dials reproducing the photograph of the potential persons likely to participate in a conference. The control of the projector 41 is effected by a code recorded on the badge 16 of each person which code is transmitted to the control unit of the projector 41 as soon as the person starts to speak.

FIG. 6 shows a block scheme of each decoder means shown in FIG. 5. Upon transmission by interface circuit I2c of the first of the decoder address pulses the output of enveloppe detector 80 goes high, activating monostable 81. The resulting pulse produced by monostable 81 is applied to the preset input of presetable down counter 82. This pulse causes counter 82 to be preset to a number determined by the signals present at the preset inputs. These preset inputs come from code selection means 83 which may be implemented by permanent wiring, thumb wheel switches, or otherwise. The output of buffer 84 is also applied to the clock input of counter 82. In response to the rising edges following the initial address pulse which presets the counter, counter 82 will count down until a reaches zero, at which point, the "O" output of the counter will go high. If the selection codes are determined by code select means 83 is equal to the number of pulses transmitted by interface circuit I2c, counter 82 will be at the zero state when address pulses cease to appear at the output of OR gates. If the number preset into counter 82 via code selection means 83 is greater than or less than the number of address pulses transmitted, counter 82 will be at other than its zero state when it stops counting.

The output at envelope detector 80 will remain high between the address pulses coming from outputs of OR gates. After the address pulses have been transmitted, the output of envelope detector 80 goes low. Monostable 85 is triggered by the falling edge of the output signal from enveloppe detector 80 and produces a short pulse in response thereto. Delay unit 88 operates in much the same manner as envelope detector 80, going high upon the first address pulse and remaining high during the succeeding address pulses. The output of delay unit 88 goes low a specified time after the termination of the address pulses, and this time is chosen so that the falling edge from delay unit 88 occurs after flip-flop 86 and flip-flop 87 have been reset by the pulse from one-shot 85. The falling edge of the signal from delay unit 88 clocks the flip-flop 86. As explained hereabove, when a number of address pulses received is equal to the number preset into counter 82, the "O" output signal from counter 82 is high, and the output of flip-flop 86 will go high upon being clocked by the output from delay unit 88. This high output from A-flip-flop 86 sets RS flip-flop 87 causing the Q output thereof to go high.

The high output RS flip-flop 87 serves as an activation signal which activates flip-flop FL1 of multivibrator MV1 according to the address signals.

Referring again to FIG. 1, it is possible to introduce into a conference or to cause a conference to be started by a person alien to a network, i.e., a person not located in a station of a network. Considering the network constituted by the stations ST1, ST2, ST3, ST4, ST5, a person not present in one of those stations can connect with one of them through a telephone line 2 of the switched network. For this purpose, that person has available a special equipment contained for instance in an attache-case 60. This attache-case comprises at least one conventional telephone handset 61 connected to an emitting unit 62 comprising particularly a badge reader, an acoustic coupling 63 well known in the art and to which is connected the conventional telephone handset 65 of a conventional telephone set 66 which may be connected for instance to the station ST2 by a telephone line 2 of the switched network. The badge 16 of this person must also be provided with a validation code compatible with the network and allowing him to gain access to the latter.

Similarly, it is possible for a station ST6 included in another communication network to communicate with a network constituted by the stations ST1, ST2, ST3, ST4, ST5 by connecting to one of these stations, e.g. the station ST5, through the medium of a telephone line 2 of the switched network, with, of course, a recognizing of a code of access to that network.

It should also be noted that it is possible to incorporate in the special connections 50 shown in FIG. 1 jamming devices 68 for preventing any indiscretion on the part of a third person.

Any station of a network may therefore be equipped either with a communication unit U such as the one shown in FIG. 2 or with a communication unit U' such as the one shown in FIG. 4, or it may be provided with both these units. Each station may also comprise several of these units connected together, and the method according to the invention may also be applied between several communication units of one and the same station.

It should also be added that the equipment of a station U may be completed with a clock device shown diagramatically at H in FIG. 3. This device may allow a person to be called automatically at a predetermined time. To this end, it is preferable that the information relating to the person to be called be previously transferred from the memory M1 to the memory M2 of smaller capacity. At the time indicated, after receiving a tripping signal produced by the device H, the processor automatically organizes the call as has been explained in describing the function of the memory M2 following a busy signal from the telephone set of a person. In this manner, a previously recorded message can be transmitted at any desired time.

Also to be noted is the fact that the microphones of the persons likely to partake in a conference and their control systems may advantageously be so arranged that only the microphone of the person desiring to speak is validated or opened and this after he has said a predetermined key word, whereas all the other microphones remain closed. The key word may be one not included in the usual language and which can be easily detected by the system. At the end of his intervention, the speaker again utters the same key word, thus closing his microphone.

Furthermore, it is possible to improve the apparatus according to the invention by connecting to processor P of communication unit U a memory card reader (not shown), said card having a capacity of 16 bits. In this card are memorized all the information relative to the coded names, the telephone numbers etc. of the persons participating in a conference. All these information are read once the card is introduced into its reader under the control of Program in PROM and transmitted for initiating a conference as previously explained. It is to be noted that the information memorized in said card can be written in memory M'1 whose old memorized information are then erased this—permits to constitute a new repertory.

The telephone lines L1, L2 referred to hereabove are of course the lines 2, the lines 50 or the lines 50'. More precisely, when communication units U of different stations are interconnected, the lines L1, L2 at terminals of winding W are lines 2 or 50, with windings W'1 and W'2 of unit U' inductively coupled to winding W. When the communication units U' of different stations are interconnected, the lines L1, L2 at terminals of winding W' are lines 2 or 50', with all winding W1 to W10 of unit U inductively coupled to winding W'.

What is claimed is:

1. A method for establishing bidirectional or conferencing telephone communications between different persons grouped into different geographically distant stations interconnected by telephone lines, each station comprising at least one emitting unit having a reading device and at least one microphone, a receiving unit having at least one loudspeaker, and a display unit, said method utilizing individual information media such as badges bearing coded information identifying each person before communicating and during the communication, said method comprising the steps of:

emitting a coded call signal from the emitting unit of one of said stations by a person at said station who wishes to initiate a conference between at least two stations to the stations where persons to be invited to participate in the conference are located;

reproducing said coded call signal at least at each of the stations receiving said coded call signal;

switching on the emitting unit of each called station only when said emitting unit has been identified by a person of the station;

a person being identified as having said individual information medium badge authorizing said person to use said station and inserting said badge into said reading device of said emitting unit of the station;

each station after receiving the coded call signal emitting a reply signal to the conference initiating station indicating that it is ready to participate in the conference;

identifyng a speaking person during the conference on the display unit of each station participating in the conference as soon as the speaker starts to speak; and automatically switching on only one microphone as soon as the first words said by a person or speaker reach a sound volume exceeding a predetermined threshold, the other microphones then being automatically switched off.

2. A method as claimed in claim 1, wherein identifying a speaker on the display unit of each station participating in the conference, as soon as the speaker starts to speak, is effected by automatically transferring the coded information identifying the speaker recorded on the speakers's badge inserted into the reading device of the speaker's emitting unit to each said station participating in the conference.

3. A method as claimed in claim 1, further comprising the steps of sending at any time during the conference, from a station participating in the conference, a coded request signal for intervention of a person of that station, by displaying said request signal for intervention on the display units of the other stations participating in the conference, and permitting said person to speak upon the permission of the initiator of the conference.

4. A method as claimed in claim 1, further comprising the steps of emitting at any time during the progress of the conference, from a station not invited to participate in the conference, a coded request signal for intervention of a person of that station, by displaying said request signal for intervention on the display units of the stations participating in the conference, and inviting said person to participate in the conference solely upon the permission of the initiator of the conference, the microphone of the requesting station being switched off as long as the station has not received a validation signal permitting said microphone to be switched on, and to prevent any person from disturbing the conference by entering into the network in an untimely manner.

5. A method as claimed in claim 1, further comprising the steps of connecting together all the stations through special connections and transmitting, via spatial multiplexing between at least two stations, coded signals for the intervention of a speaker, call signals, reply signals, or request-for-intervention signals, and data signals.

6. A method as claimed in claim 1, further comprising the steps of permitting transmission of a speaker's speech from one station to one or several other stations, and permitting a station participating or not participating in the conference to communicate with a data processing unit through a telephone line of a switched network in order to receive information which may thereafter be transmitted to one or several stations.

7. A method as claimed in claim 1, further comprising the steps of automatically identifying on the display units of all the stations participating in the conference, the geographical location of the station emitting a call signal, identifying on the display units of all the stations participating in the conference, the geographical locations of the stations emitting a reply signal, and switching on the loudspeaker of the receiving unit of a station as soon as said station has emitted either a call signal or a reply signal.

8. A method as claimed in claim 1, further comprising the steps of permitting any station to receive at any time a call signal from another station, and permitting any station not participating in a conference in progress to be automatically informed of the various stations participating in said conference.

9. A method as claimed in claim 1, wherein the display unit of each station has a display device, and further comprising the steps of establishing a conference upon the initiative of a person of a station with predetermined persons of several stations by said person transmitting a coded call signal
   to the stations where said predetermined persons are located and coded signals relative to the names of said persons, displaying on one and the same display device of the display unit of each station concerned the name of the station or the name of the person or persons called at the station, and validating in each of said stations the reply signal of a station only if said reply signal is emitted by the person or persons actually invited to participate in the conference.

10. A method as claimed in claim 1, wherein each station further comprises a display device on which a speaker's photograph is displayed.

11. A method as claimed in claim 1, wherein all the stations are grouped into a star network with a central station connected to the other stations of the network by special connections.

12. A method as claimed in claim 5, wherein each of said special connections between two stations has a pass band ranging from 300 to 3000 c.p.s. and further comprising, in order to provide said transmissions between at least two stations, the step of dividing into different channels said pass band including a first channel of from 300 to 2000 c.p.s. reserved for speech, a second channel of from 2000 to 2500 c.p.s. reserved for the transmission of data at 300 bauds, and four additional channels defined in a range from 2500 to 3000 c.p.s. reserved for signalling and including call signals, reply signals and request-for-intervention signals.

13. A method as claimed in claim 9, wherein each station further comprises a memory, and further comprising the steps of automatically transmitting the coded call signal and the coded signals relative to the names of said persons in accordance with a predetermined program, said names of said persons being previously recorded in said memory, and managing requests for intervention during a conference by providing a priority number for each request, said priority number being displayed on said display device and being increased by one unit every time a request for intervention is validated.

14. A method as claimed in claim 10, further comprising the step of controlling said display device of each station via the information of the speaker's badge, said control being initiated as soon as the speaker starts to speak.

15. A method as claimed in claim 11, further comprising the step of authorizing communication between two networks through a telephone line of a switched network.

16. A method as claimed in claim 12, wherein each station further comprises a magnetic medium, and further comprising the step of permitting, independently of the transmission of a speaker's speech from one station to at least one other station, data transmission by an emitting station participating or not participating in the conference through said second channel to at least one station participating or not participating in the conference, said data being in the form of a message recorded on said magnetic medium.

17. A method as claimed in claim 16, wherein the emitting unit of each station also has an alpha-numeric keyboard, and further comprising the step of associating a code with each said message to authorize exclusively the person for whom said message is intended to receive said message, said code being compared with a code either previously recorded on the badge of the person who, in order to be informed of a message, inserts said badge into said reading device of said emitting unit, or by introducing said code on the alpha-numeric keyboard of said emitting unit of the station.

18. A method as claimed in claim 16, wherein each station further comprises a printer, and further comprising the steps of displaying each said message, upon emission or reception thereof, on the display unit of said emitting unit and printing said message on said printer.

19. A method for establishing bidirectional and particularly conferencing telephone communications between different persons grouped into different geographically distant stations and interconnected by telephone lines, each station comprising at least one emitting unit having a reading device and at least one microphone, a receiving unit having at least one loudspeaker, and a display unit, said method utilizing individual information media such as badges bearing coded information identifying each person communicating, said method comprising the steps of:

emitting by one of the persons wishing to initiate a conference from the emitting unit of the person's station a coded call signal to the stations where persons invited to participate in the conference are located;

reproducing the coded call signal at each of the stations receiving said signal;

switching on the emitting unit of each station receiving said coded call signal, said emitting unit of each called station being switched on only when said emitting unit has been identified by a person of the station;

a person being identified by having said individual information medium badge authorizing said person to use said station and inserting said information medium badge into said reading device associated with said emitting unit of the station, a person of one of the stations participating in the conference being authorized to speak during the conference only after having inserted the individual information medium badge into said reader of said emitting unit, said identifying information of said person being transferred to each said station and displayed by the display unit thereof; and each switched on station after receiving the coded call signal emitting a reply signal to the conference initiating station to indicate that it is ready to participate in the conference.

20. Apparatus for establishing bidirectional and particularly conferencing telephone communications for exchanging information in the form of telephone data or messages, said apparatus having a telephone line, a telephone set with a handset, at least one alpha-numeric keyboard, a display unit and a processing circuit including a miroprocessor having a central unit, a first memory unit in which is recorded information identifying a person acceptable to participate in a conference, said memory unit including a repertory, a programmable read only memory comprising at least one recorded program insuring various automatic sequences of telephone call search and launch to a different person, and an interface circuit connected between said microprocessor, said alpha-numeric keyboard and said display unit and a switching circuit connected to said telephone set and to said telephone line, said apparatus further comprising a second memory unit in said first memory unit for registering person identifying information extracted from said repertory, but whose call sequence resulted in a busy line signal, after automatically emitting said identifying information through said telephone line for attempting to contact the person, in order to effect again and automatically, after a specified time delay, at least one attempt to contact that person via said handset.

21. Apparatus as claimed in claim 20, wherein said second memory unit comprises a memory of smaller capacity than that of said first memory unit and is adapted to record a reduced number of person identifying information elements and said processing circuit is adapted to insure successive automatic recalls of subscribers associated with a person identifying information element.

22. Apparatus as claimed in claim 20, further comprising badges bearing coded information identifying each person authorized to communicate via said apparatus.

23. Apparatus as claimed in claim 21, wherein said display unit provides a simultaneous display of all the person identifying information contained in said seocnd memory unit and comprising advantageously a mark indicating the person identifying information involved in an automatic recall, the call sequence of which has resulted in a busy line signal, in order to effect again and automatically, after a specified time delay, at least one attempt to contact that person via said handset.

24. Apparatus as claimed in claim 21, further comprising a third memory unit for registering person identifying information concerning a new correspondent before, if necessary, introducing said information into said repertory, after said correspondent has been contacted via said handset.

25. Apparatus as claimed in claim 21, further comprising a numerical keyboard for entering correspondents' telephone numbers into said repertory.

26. Apparatus as claimed in claim 20, wherein said communications are between stations distant from each other and said apparatus is provided at each of said stations with a microprocessor, and further comprising a clock device connected to said microprocessor, said microprocessor starting, after receipt of a signal from said clock device at a time previously recorded in said clock device, an automatic call to a correspondent whose identifying information has previously been introduced into said second memory unit.

27. Apparatus as claimed in claim 22, wherein each of said badges further bears at least one coded information compatible with a code identifying a specific communication network whereby a person with one of said badges may communicate via said network.

28. Apparatus as claimed in claim 26, further comprising a plurality of emitting devices each comprising a badge reader, directly connectible to said handset whereby a person within said network may call or be called by a person outside said network.

29. Apparatus for establishing bidirectional and particularly conferencing telephone communications for exchanging information in the form of telephone data or messages between different persons grouped into different geographically distant stations of a communication network connected together by telephone lines, said apparatus comprising:

at each station, at least one emitting unit having a microphone, a receiving unit having a loudspeaker, a display unit including first light-emitting diodes, a reading unit for reading information from a badge bearing an individual information medium, said information including the name of a person possessing said badge for identifying said person during a conference, a person being identified as having said individual information medium badge authorizing said person to use said station and inserting said badge into said reading device of said emitting unit of the station, and an interface unit interconnecting said emitting unit, said receiving unit, said display unit and said reading unit to a telephone line, said emitting unit of said station being switched on only when said person has been identified by a person at the station, and further comprising at each station a synoptic panel diagrammatically reproducing geographical limits of said network grouping several stations and indicating locations of the various stations of said network, a plurality of second light-emitting diode each representing a corresponding one of said stations and each providing a luminous state which indicates at any moment the state of the corresponding station during a conference, and control means for controlling said diodes according to the progress of a conference.

30. Apparatus for establishing bidirectional and particularly conferencing telephone communications for exchanging information in the form of telephone data or messages between different persons grouped into different geographically distant stations of a communication network connected together by telephone lines, said apparatus comprising:

at each station, at least one emitting unit having a microphone, a receiving unit having a loudspeaker, a display unit including first light-emitting diodes, a reading unit for reading information from a badge bearing an individual information medium, said information including the name of a person possessing said badge for identifying said person during a conference, a person being identified as having said individual information medium badge authorizing said person to use said station and inserting said badge into said reading device of said emitting unit of the station, and an interface unit interconnecting said emitting unit, said receiving unit, said display unit and said reading unit to a telephone line, said emitting unit of each station being switched on only when said person has been identified by a person at the station, and further comprising at each station a display board having a plurality of columns for displaying a name of each station invited to join in a conference, a name or names of the person or persons of those stations invited to participate in that conference, information indicating that a called station has replied to an invitation to join in the conference, and information in numerical form, for indicating a sequence number of a request for intervention originating from a person of the invited station.

31. Apparatus for establishing bidirectional and particularly conferencing telephone communications for exchanging information in the form of telephone data or messages between different persons grouped into different geographically distant stations of a communication network connected together by telephone lines, said apparatus comprising:

at each station, at least one emitting unit having a microphone, a receiving unit having a loudspeaker, a display unit including first light-emitting diodes, a reading unit for reading information from a badge bearing an individual information medium, said information including the name of a person possessing said badge for identifying said person during a conference, a person being identified as having said individual information medium badge authorizing said person to use said station and inserting said badge into said reading device of said emitting unit of the station, and an interface unit interconnecting said emitting unit, said receiving unit, said display unit and said reading unit to a telephone line, said emitting unit of each station being switched on only when said person has been identified by a person at the station, and further comprising at each station, detecting means for detecting a predetermined key word uttered by a speaker and controlling only the operation of a microphone of said speaker, other microphones being maintained inoperative and said microphone of said speaker being rendered inoperative when said detecting means detect a second key word uttered by said speaker.

32. Apparatus as claimed in claim 20, further comprising a reader of memory cards in which are memorized information identifying a person acceptable to participate in a conference, said reader being connected to said processing circuit.

* * * * *